United States Patent
Huang et al.

(10) Patent No.: US 10,466,878 B2
(45) Date of Patent: Nov. 5, 2019

(54) SCREEN CAPTURING METHOD AND APPARATUS

(71) Applicant: Huawei Technologies Co., Ltd., Shenzhen (CN)

(72) Inventors: Xi Huang, Shenzhen (CN); Huangwei Wu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 151 days.

(21) Appl. No.: 15/508,793

(22) PCT Filed: Sep. 4, 2014

(86) PCT No.: PCT/CN2014/085948
§ 371 (c)(1),
(2) Date: Mar. 3, 2017

(87) PCT Pub. No.: WO2016/033787
PCT Pub. Date: Mar. 10, 2016

(65) Prior Publication Data
US 2017/0277403 A1  Sep. 28, 2017

(51) Int. Cl.
*G06F 3/0484* (2013.01)
*G06F 21/60* (2013.01)
*G06F 21/62* (2013.01)
*H04L 29/06* (2006.01)

(52) U.S. Cl.
CPC ...... *G06F 3/04842* (2013.01); *G06F 3/04845* (2013.01); *G06F 21/60* (2013.01); *G06F 21/6254* (2013.01); *H04L 65/4015* (2013.01); *G06F 2221/2143* (2013.01)

(58) Field of Classification Search
CPC .................................................. G06F 3/1438
USPC ................................. 715/763, 765, 851, 840
See application file for complete search history.

(56) References Cited

U.S. PATENT DOCUMENTS

| 2006/0036739 | A1 | 2/2006 | Hagale et al. |
| 2008/0051072 | A1 | 2/2008 | Kraft et al. |
| 2012/0169762 | A1 | 7/2012 | Kocjan et al. |
| 2014/0378099 | A1* | 12/2014 | Huang ............... H04M 1/67 455/411 |
| 2015/0332439 | A1* | 11/2015 | Zhang ................. G06T 5/002 345/647 |
| 2016/0048636 | A1* | 2/2016 | Warner ............. G06F 3/1438 345/633 |

(Continued)

FOREIGN PATENT DOCUMENTS

| CN | 101507246 A | 8/2009 |
| CN | 104021350 A | 9/2014 |
| WO | 2011114307 A2 | 9/2011 |

*Primary Examiner* — Cao H Nguyen
(74) *Attorney, Agent, or Firm* — Slater Matsil, LLP

(57) ABSTRACT

Embodiments disclose a screen capturing method and an apparatus. The screen capturing method includes: running a target application, and displaying a first interface of the target application. The method also includes receiving a screen capturing instruction entered by a user; sending an indication message to the target application according to the screen capturing instruction, so that the target application modifies the first interface to a second interface according to the indication message, where the first interface is different from the second interface; and generating a screen capture picture according to the second interface.

12 Claims, 6 Drawing Sheets

(56) References Cited

U.S. PATENT DOCUMENTS

2016/0266757 A1\* 9/2016 Ye .......................... G06F 3/048

\* cited by examiner

SCREEN CAPTURING METHOD AND APPARATUS

CROSS-REFERENCE TO RELATED APPLICATIONS

This application is a National Stage of International Application No. PCT/CN2014/085948, filed on Sep. 4, 2014, which is hereby incorporated by reference in its entirety.

TECHNICAL FIELD

The present invention relates to the field of computer technologies, and in particular, to a screen capturing method and an apparatus.

BACKGROUND

With continuous development of electronic technologies, functions of user equipment are increasingly diverse, for example, screen capturing. When screen capturing is performed on user equipment, a screen capture picture includes all content in an application interface. However, sometimes a user does not want some information in the application interface to be included in the screen capture picture, for example, when a user interface of Yu'E Bao is captured, the user does not want balance information and account information to be included in a screen capture picture. At present, a manner of removing information in a screen capture picture is mainly as follows: capturing all content in an application interface first, and then editing a screen capture picture by using picture-editing software to remove some information in the screen capture picture.

In the foregoing manner, because the user needs to operate manually to remove information in the screen capture picture by using picture-editing software, screen capturing efficiency is reduced. In addition, because the picture-editing software needs to be used, screen capturing flexibility is reduced.

SUMMARY

Embodiments of the present invention disclose a screen capturing method and an apparatus, to improve screen capturing efficiency and flexibility.

A first aspect of the embodiments of the present invention discloses a screen capturing method. The method includes running a target application, and displaying a first interface of the target application. The method also includes receiving a screen capturing instruction entered by a user; sending an indication message to the target application according to the screen capturing instruction, so that the target application modifies the first interface to a second interface according to the indication message, where the first interface is different from the second interface; and generating a screen capture picture according to the second interface.

With reference to the first aspect of the embodiments of the present invention, in a first possible implementation manner of the first aspect of the embodiments of the present invention, a manner in which the target application modifies the first interface to the second interface according to the indication message is specifically: obtaining, by the target application, target information in the first interface according to the indication message by using a keyword or in a preset mode, and modifying the first interface according to the target information to obtain the second interface.

With reference to the first aspect of the embodiments of the present invention, in a second possible implementation manner of the first aspect of the embodiments of the present invention, a manner in which the target application modifies the first interface to the second interface according to the indication message is specifically: obtaining, by the target application, a target information area in the first interface according to the indication message by using a keyword or in a preset mode, and marking the target information area to obtain the second interface.

With reference to the second possible implementation manner of the first aspect of the embodiments of the present invention, in a third possible implementation manner of the first aspect of the embodiments of the present invention, the generating a screen capture picture according to the second interface includes: displaying the second interface; detecting a target information area selected by the user from the marked target information area included in the second interface; modifying the second interface according to the selected target information area to obtain a third interface; and generating the screen capture picture that includes at least the third interface.

With reference to the first aspect of the embodiments of the present invention and any one of the first to the third possible implementation manners of the first aspect of the embodiments of the present invention, in a fourth possible implementation manner of the first aspect of the embodiments of the present invention, after the generating a screen capture picture according to the second interface, the method further includes: redisplaying the first interface.

With reference to the first aspect of the embodiments of the present invention and any one of the first to the third possible implementation manners of the first aspect of the embodiments of the present invention, in a fifth possible implementation manner of the first aspect of the embodiments of the present invention, the method further includes: saving the screen capture picture.

A second aspect of the embodiments of the present invention discloses a screen capturing method. The method includes, when a target interface of a target application is displayed, detecting a screen capturing instruction entered by a user. The method also includes responding to the screen capturing instruction, and capturing an interface that includes at least the target interface to obtain a target interface picture. The method also includes recognizing target information in the target interface picture; and modifying the target interface picture according to the target information to generate a screen capture picture.

With reference to the second aspect of the embodiments of the present invention, in a first possible implementation manner of the second aspect of the embodiments of the present invention, the recognizing target information in the target interface picture includes: recognizing and marking a target information area in the target interface picture; detecting a target information area selected by the user from the marked target information area; and using information included in the selected target information area as the target information in the target interface picture.

With reference to the second aspect of the embodiments of the present invention, in a second possible implementation manner of the second aspect of the embodiments of the present invention, the recognizing target information in the target interface picture includes: recognizing the target information in the target interface picture according to a keyword.

With reference to the second aspect of the embodiments of the present invention, in a third possible implementation manner of the second aspect of the embodiments of the present invention, the recognizing target information in the target interface picture includes: recognizing the target information in the target interface picture in a preset mode.

With reference to the second aspect of the embodiments of the present invention and any one of the first to the third possible implementation manners of the second aspect of the embodiments of the present invention, in a fourth possible implementation manner of the second aspect of the embodiments of the present invention, after the modifying the target interface picture according to the target information to generate a screen capture picture, the method further includes: redisplaying the first interface.

With reference to the second aspect of the embodiments of the present invention and any one of the first to the third possible implementation manners of the second aspect of the embodiments of the present invention, in a fifth possible implementation manner of the second aspect of the embodiments of the present invention, the method further includes: saving the screen capture picture.

A third aspect of the embodiments of the present invention discloses user equipment. The user equipment includes a display unit, configured to run a target application, and display a first interface of the target application. The user equipment also includes a receiving unit, configured to receive a screen capturing instruction entered by a user. The user equipment also includes a sending unit, configured to send an indication message to the target application according to the screen capturing instruction received by the receiving unit, so that the target application modifies, according to the indication message, the first interface displayed by the display unit to a second interface, where the first interface is different from the second interface; and a generation unit, configured to generate a screen capture picture according to the second interface.

With reference to the third aspect of the embodiments of the present invention, in a first possible implementation manner of the third aspect of the embodiments of the present invention, a manner in which the target application modifies the first interface to the second interface according to the indication message is specifically: obtaining, by the target application, target information in the first interface according to the indication message by using a keyword or in a preset mode, and modifying the first interface according to the target information to obtain the second interface.

With reference to the third aspect of the embodiments of the present invention, in a second possible implementation manner of the third aspect of the embodiments of the present invention, a manner in which the target application modifies the first interface to the second interface according to the indication message is specifically: obtaining, by the target application, a target information area in the first interface according to the indication message by using a keyword or in a preset mode, and marking the target information area to obtain the second interface.

With reference to the second possible implementation manner of the third aspect of the embodiments of the present invention, in a third possible implementation manner of the third aspect of the embodiments of the present invention, the generation unit includes: a display subunit, configured to display the second interface; a detection subunit, configured to detect a target information area selected by the user from the marked target information area included in the second interface displayed by the display subunit; an obtaining subunit, configured to modify the second interface according to the selected target information area detected by the detection subunit to obtain a third interface; and a generation subunit, configured to generate the screen capture picture that includes at least the third interface obtained by the obtaining subunit.

With reference to the third aspect of the embodiments of the present invention and any one of the first to the third possible implementation manners of the third aspect of the embodiments of the present invention, in a fourth possible implementation manner of the third aspect of the embodiments of the present invention, the display unit is further configured to redisplay the first interface.

With reference to the third aspect of the embodiments of the present invention and any one of the first to the third possible implementation manners of the third aspect of the embodiments of the present invention, in a fifth possible implementation manner of the third aspect of the embodiments of the present invention, the user equipment further includes: a saving unit, configured to save the screen capture picture generated by the generation unit.

A fourth aspect of the embodiments of the present invention discloses user equipment. The user equipment also includes a processor, a memory, an input apparatus, and an output apparatus. The memory stores a group of program code, and the processor is configured to invoke the program code stored in the memory to perform the following operation: running a target application; the output apparatus is configured to display a first interface of the target application. The input apparatus is configured to receive a screen capturing instruction entered by a user and send the screen capturing instruction to the processor; where the processor is further configured to invoke the program code stored in the memory to perform the following operations: sending an indication message to the target application according to the screen capturing instruction, so that the target application modifies the first interface to a second interface according to the indication message, where the first interface is different from the second interface; and generating a screen capture picture according to the second interface.

With reference to the fourth aspect of the embodiments of the present invention, in a first possible implementation manner of the fourth aspect of the embodiments of the present invention, a manner in which the target application modifies the first interface to the second interface according to the indication message is specifically: obtaining, by the target application, target information in the first interface according to the indication message by using a keyword or in a preset mode, and modifying the first interface according to the target information to obtain the second interface.

With reference to the fourth aspect of the embodiments of the present invention, in a second possible implementation manner of the fourth aspect of the embodiments of the present invention, a manner in which the target application modifies the first interface to the second interface according to the indication message is specifically: obtaining, by the target application, a target information area in the first interface according to the indication message by using a keyword or in a preset mode, and marking the target information area to obtain the second interface.

With reference to the second possible implementation manner of the fourth aspect of the embodiments of the present invention, in a third possible implementation manner of the fourth aspect of the embodiments of the present invention, a manner in which the processor generates the screen capture picture according to the second interface is specifically: displaying the second interface; detecting a target information area selected by the user from the marked target information area included in the second interface; modifying the second interface according to the selected target information area to obtain a third interface; and generating the screen capture picture that includes at least the third interface.

With reference to the fourth aspect of the embodiments of the present invention and any one of the first to the third possible implementation manners of the fourth aspect of the embodiments of the present invention, in a fourth possible implementation manner of the fourth aspect of the embodiments of the present invention, after the processor generates the screen capture picture according to the second interface, the output apparatus is further configured to redisplay the first interface.

With reference to the fourth aspect of the embodiments of the present invention and any one of the first to the third possible implementation manners of the fourth aspect of the embodiments of the present invention, in a fifth possible implementation manner of the fourth aspect of the embodiments of the present invention, the processor is further configured to invoke the program code stored in the memory to perform the following operation: saving the screen capture picture.

A fifth aspect of the embodiments of the present invention discloses user equipment. The user equipment includes a detection unit, configured to: when a target interface of a target application is displayed, detect a screen capturing instruction entered by a user. The user equipment also includes an obtaining unit, configured to: respond to the screen capturing instruction detected by the detection unit, and capture an interface that includes at least the target interface to obtain a target interface picture. The user equipment also includes an identifying unit, configured to recognize target information in the target interface picture obtained by the obtaining unit. The user equipment also includes a generation unit, configured to modify the target interface picture according to the target information recognized by the identifying unit, to generate a screen capture picture.

With reference to the fifth aspect of the embodiments of the present invention, in a first possible implementation manner of the fifth aspect of the embodiments of the present invention, the identifying unit includes: a marking subunit, configured to recognize and mark a target information area in the target interface picture obtained by the obtaining unit; and a detection subunit, configured to: detect a target information area selected by the user from the target information area marked by the marking subunit, and use information included in the selected target information area as the target information in the target interface picture.

With reference to the fifth aspect of the embodiments of the present invention, in a second possible implementation manner of the fifth aspect of the embodiments of the present invention, the identifying unit is specifically configured to recognize, according to a keyword, the target information in the target interface picture obtained by the obtaining unit.

With reference to the fifth aspect of the embodiments of the present invention, in a third possible implementation manner of the fifth aspect of the embodiments of the present invention, the identifying unit is specifically configured to recognize, in a preset mode, the target information in the target interface picture obtained by the obtaining unit.

With reference to the fifth aspect of the embodiments of the present invention and any one of the first to the third possible implementation manners of the fifth aspect of the embodiments of the present invention, in a fourth possible implementation manner of the fifth aspect of the embodiments of the present invention, the user equipment further includes: a display unit, configured to redisplay the first interface.

With reference to the fifth aspect of the embodiments of the present invention and any one of the first to the third possible implementation manners of the fifth aspect of the embodiments of the present invention, in a fifth possible implementation manner of the fifth aspect of the embodiments of the present invention, the user equipment further includes: a saving unit, configured to save the screen capture picture generated by the generation unit.

A sixth aspect of the embodiments of the present invention discloses user equipment. The user equipment includes a processor, a memory, an input apparatus, and an output apparatus. The output apparatus is configured to display a target interface of a target application. The input apparatus is configured to detect a screen capturing instruction entered by a user and send the screen capturing instruction to the processor. The memory stores a group of program code, and the processor is configured to invoke the program code stored in the memory to perform the following operations: responding to the screen capturing instruction sent by the input apparatus, and capturing an interface that includes at least the target interface displayed by the output apparatus to obtain a target interface picture; recognizing target information in the target interface picture; and modifying the target interface picture according to the target information to generate a screen capture picture.

With reference to the sixth aspect of the embodiments of the present invention, in a first possible implementation manner of the sixth aspect of the embodiments of the present invention, a manner in which the processor recognizes the target information in the target interface picture is specifically: recognizing and marking a target information area in the target interface picture; detecting a target information area selected by the user from the marked target information area; and using information included in the selected target information area as the target information in the target interface picture.

With reference to the sixth aspect of the embodiments of the present invention, in a second possible implementation manner of the sixth aspect of the embodiments of the present invention, a manner in which the processor recognizes the target information in the target interface picture is specifically: recognizing the target information in the target interface picture according to a keyword.

With reference to the sixth aspect of the embodiments of the present invention, in a third possible implementation manner of the sixth aspect of the embodiments of the present invention, a manner in which the processor recognizes the target information in the target interface picture is specifically: recognizing the target information in the target interface picture in a preset mode.

With reference to the sixth aspect of the embodiments of the present invention and any one of the first to the third possible implementation manners of the sixth aspect of the embodiments of the present invention, in a fourth possible implementation manner of the sixth aspect of the embodiments of the present invention, after the processor modifies the target interface picture according to the target information to generate the screen capture picture, the output apparatus is further configured to redisplay the first interface.

With reference to the sixth aspect of the embodiments of the present invention and any one of the first to the third possible implementation manners of the sixth aspect of the embodiments of the present invention, in a fifth possible implementation manner of the sixth aspect of the embodiments of the present invention, the processor is further configured to invoke the program code stored in the memory to perform the following operation: saving the screen capture picture.

In the embodiments of the present invention, when an interface of a target application is to be captured, the target application first modifies the interface of the target application, so that a screen capture picture is generated according to a modified interface of the target application. Therefore, screen capturing efficiency and flexibility are improved.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiments of the present invention disclose a screen capturing method and an apparatus, to improve screen capturing efficiency and flexibility. Details are described in the following separately.

Figure 1:
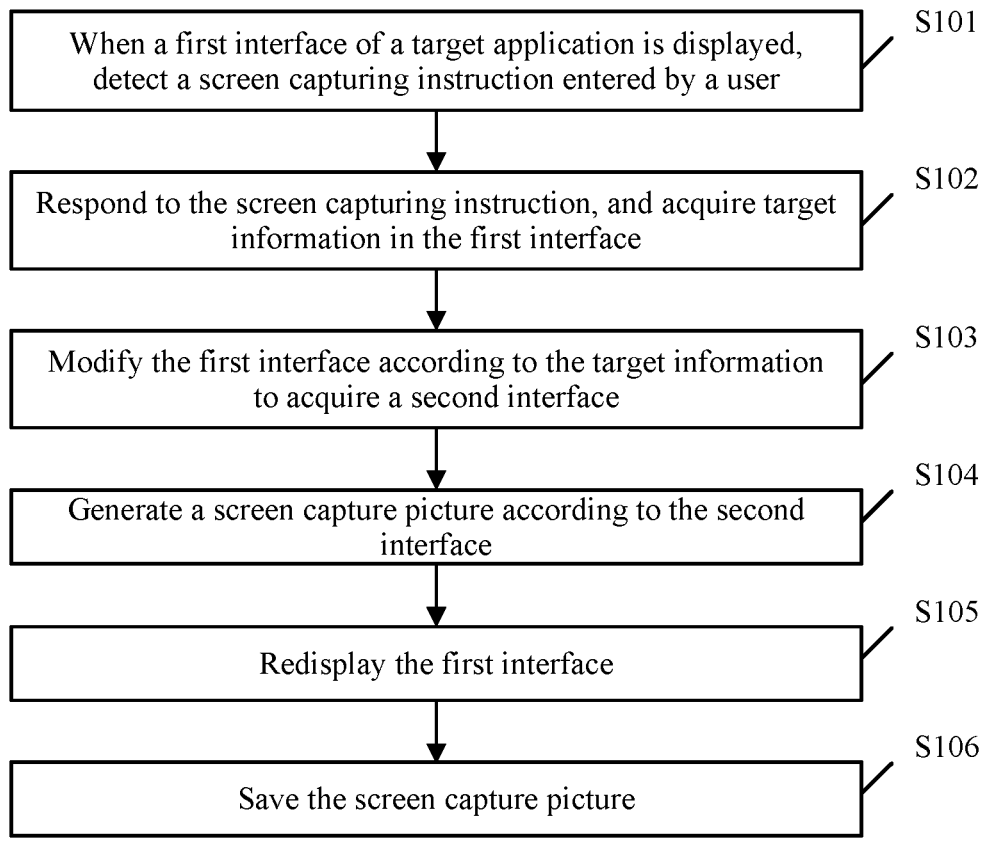
FIG. 1 is a flowchart of a screen capturing method disclosed in an embodiment of the present invention.

Referring to FIG. 1, FIG. 1 is a flowchart of a screen capturing method disclosed in an embodiment of the present invention. The screen capturing method shown in FIG. 1 is applicable to user equipment such as a mobile phone or a tablet computer, which is not limited in this embodiment of the present invention. As shown in FIG. 1, the screen capturing method may include the following steps:

S101. When a first interface of a target application is displayed, detect a screen capturing instruction entered by a user.

In this embodiment, when user equipment displays the first interface of the target application, and the user wants to capture the first interface but does not want to capture target information in the first interface, the user enters the screen capturing instruction, and the user equipment detects the screen capturing instruction entered by the user. The target application may be at least one of applications such as WeChat, QQ, Yu'E Bao, or Alipay of the user equipment. The target information may be information that the user does not want others to know, such as a user name, a user ID number, a user account amount, a user phone number, and a name in chat records.

S102. Respond to the screen capturing instruction, and obtain target information in the first interface.

In this embodiment, when detecting the screen capturing instruction, the user equipment responds to the screen capturing instruction, and may save a screen capture picture of the first interface and obtain the target information in the first interface. The screen capture picture of the first interface is saved to facilitate invoking by the user in subsequent use. Alternatively, the user equipment may not save a screen capture picture of the first interface but obtain only the target information in the first interface, which is not limited in this embodiment.

In a possible implementation manner, a manner of responding to the screen capturing instruction and obtaining the target information in the first interface is specifically: responding to the screen capturing instruction, and obtaining the target information in the first interface according to a keyword.

In this embodiment, the keyword may be preset by the user equipment or the target application, or may be specified by a cloud server, which is not limited in this embodiment.

In a possible implementation manner, a manner of responding to the screen capturing instruction and obtaining the target information in the first interface is specifically: responding to the screen capturing instruction, and obtaining the target information in the first interface in a preset mode.

In this embodiment, a preset mode may be a mode in which only data or a letter whose length is greater than or equal to a preset length is recognized.

S103. Modify the first interface according to the target information to obtain a second interface.

In this embodiment, the modifying the first interface according to the target information may be deleting the target information in the first interface, or may be replacing the target information in the first interface according to a fixed format, for example, a method of covering by using mosaic.

In a possible implementation manner, a manner of modifying the first interface according to the target information to obtain the second interface is specifically: modifying, according to the target information, the first interface stored in a video memory to obtain the second interface.

S104. Generate a screen capture picture according to the second interface.

S105. Redisplay the first interface.

In this embodiment, after generating the screen capture picture, the user equipment redisplays the first interface, to restore display of the first interface.

S106. Save the screen capture picture.

In this embodiment, after generating the screen capture picture, the user equipment may save the screen capture picture in a nonvolatile memory, to facilitate invoking by the user in subsequent use.

In the screen capturing method described in FIG. 1, when an interface of a target application is to be captured, target information in the interface of the target application can be automatically obtained, and the interface of the target application is modified according to the target information; then, a screen capture picture is generated according to a modified interface of the target application. Therefore, screen capturing efficiency and flexibility are improved.

Figure 2:
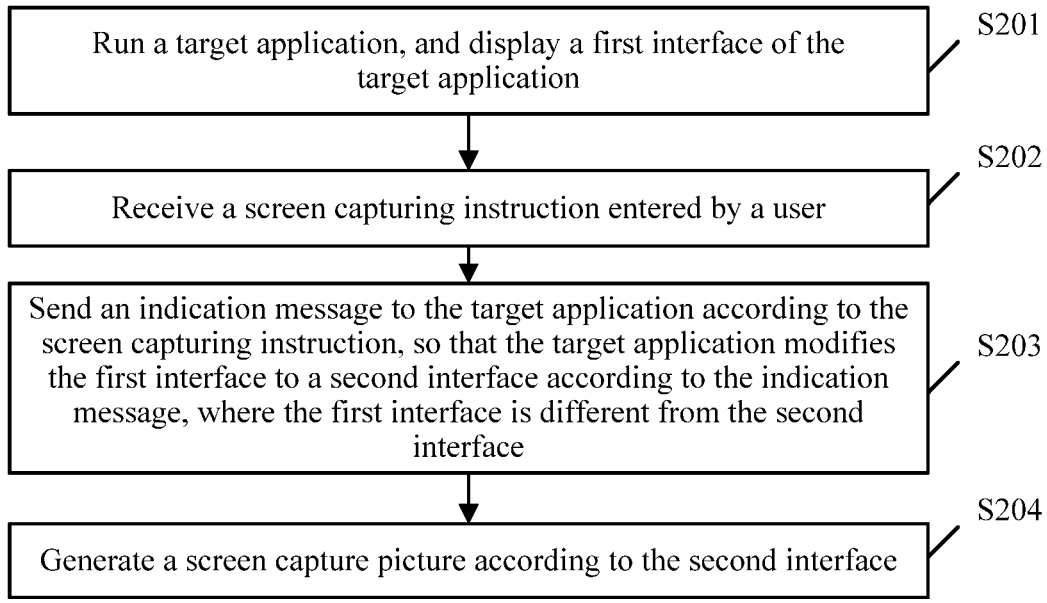
FIG. 2 is a flowchart of another screen capturing method disclosed in an embodiment of the present invention.

Referring to FIG. 2, FIG. 2 is a flowchart of another screen capturing method disclosed in an embodiment of the present invention. The screen capturing method shown in FIG. 2 is applicable to user equipment such as a mobile phone or a tablet computer, which is not limited in this embodiment of the present invention. As shown in FIG. 2, the screen capturing method may include the following steps.

S201. Run a target application, and display a first interface of the target application.

In this embodiment, when a user wants to capture the first interface of the target application, user equipment first runs the target application, and displays the first interface of the target application.

S202. Receive a screen capturing instruction entered by a user.

In this embodiment, when the user wants to capture the first interface but does not want to capture target information in the first interface, the user enters the screen capturing instruction, and the user equipment detects the screen capturing instruction entered by the user. The target application may be at least one of applications such as WeChat, QQ, Yu'E Bao, or Alipay of the user equipment. The target information may be information that the user does not want others to know, such as a user name, a user ID number, a user account amount, a user phone number, and a name in chat records.

S203. Send an indication message to the target application according to the screen capturing instruction, so that the target application modifies the first interface to a second interface according to the indication message, where the first interface is different from the second interface.

In a possible implementation manner, a manner in which the target application modifies the first interface to the second interface according to the indication message is specifically: obtaining, by the target application, target information in the first interface according to the indication message by using a keyword or in a preset mode, and modifying the first interface according to the target information to obtain the second interface.

In a possible implementation manner, a manner in which the target application modifies the first interface to the second interface according to the indication message is specifically: obtaining, by the target application, a target information area in the first interface according to the indication message by using a keyword or in a preset mode, and marking the target information area to obtain the second interface.

In this embodiment, after modifying the first interface to the second interface according to the indication message, the target application may send a modification complete message to the user equipment.

S204. Generate a screen capture picture according to the second interface.

In this embodiment, when receiving the modification complete message sent by the target application, the user equipment generates the screen capture picture according to the second interface.

In a possible implementation manner, a manner of generating the screen capture picture according to the second interface is specifically: displaying the second interface; detecting a target information area selected by the user from the marked target information area included in the second interface; modifying the second interface according to the selected target information area to obtain a third interface; and generating the screen capture picture that includes at least the third interface.

In this embodiment, when the target application obtains only the target information area, the user equipment needs to display the target information area, so that the user selects the target information area from the displayed target information area to obtain the target information. Because the user has confirmed the obtained target information, accuracy of the target information is improved.

In the screen capturing method described in FIG. 2, when an interface of a target application is to be captured, the target application modifies the interface of the target application, so that a screen capture picture is generated according to a modified interface of the target application. Therefore, screen capturing efficiency and flexibility are improved.

Figure 3:
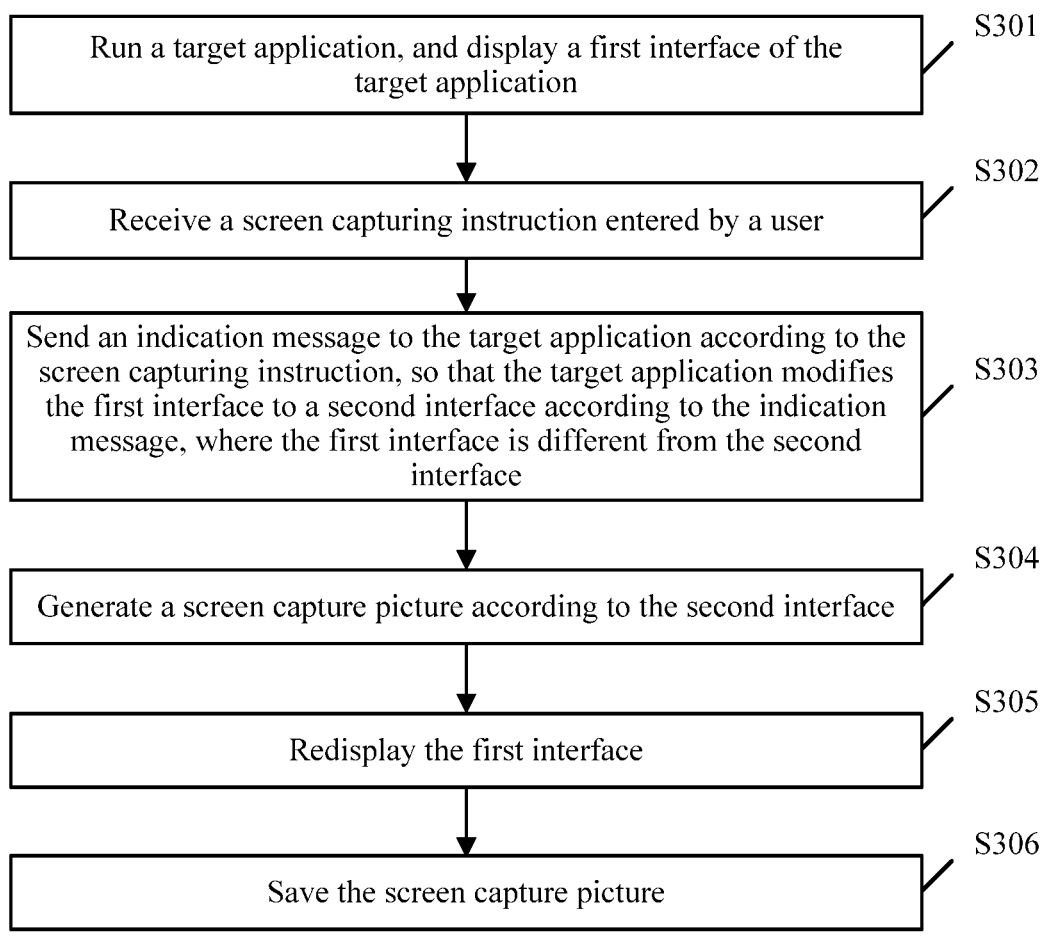
FIG. 3 is a flowchart of still another screen capturing method disclosed in an embodiment of the present invention.

Referring to FIG. 3, FIG. 3 is a flowchart of still another screen capturing method disclosed in an embodiment of the present invention. The screen capturing method shown in FIG. 3 is applicable to user equipment such as a mobile phone or a tablet computer, which is not limited in this embodiment of the present invention. As shown in FIG. 3, the screen capturing method may include the following steps.

S301. Run a target application, and display a first interface of the target application.

In this embodiment, when a user wants to capture the first interface of the target application, user equipment first runs the target application, and displays the first interface of the target application.

S302. Receive a screen capturing instruction entered by a user.

In this embodiment, when the user wants to capture the first interface but does not want to capture target information in the first interface, the user enters the screen capturing instruction, and the user equipment detects the screen capturing instruction entered by the user. The target application may be at least one of applications such as WeChat, QQ, Yu'E Bao, or Alipay of the user equipment. The target information may be information that the user does not want others to know, such as a user name, a user ID number, a user account amount, a user phone number, and a name in chat records.

S303. Send an indication message to the target application according to the screen capturing instruction, so that the target application modifies the first interface to a second interface according to the indication message, where the first interface is different from the second interface.

In a possible implementation manner, a manner in which the target application modifies the first interface to the second interface according to the indication message is specifically: obtaining, by the target application, target information in the first interface according to the indication message by using a keyword or in a preset mode, and modifying the first interface according to the target information to obtain the second interface.

In a possible implementation manner, a manner in which the target application modifies the first interface to the second interface according to the indication message is specifically: obtaining, by the target application, a target information area in the first interface according to the indication message by using a keyword or in a preset mode, and marking the target information area to obtain the second interface.

In this embodiment, after modifying the first interface to the second interface according to the indication message, the target application may send a modification complete message to the user equipment.

S304. Generate a screen capture picture according to the second interface.

In this embodiment, when receiving the modification complete message sent by the target application, the user equipment generates the screen capture picture according to the second interface.

In a possible implementation manner, a manner of generating the screen capture picture according to the second interface is specifically: displaying the second interface; detecting a target information area selected by the user from the marked target information area included in the second interface; modifying the second interface according to the selected target information area to obtain a third interface; and generating the screen capture picture that includes at least the third interface.

In this embodiment, when the target application obtains only the target information area, the user equipment needs to display the target information area, so that the user selects the target information area from the displayed target information area to obtain the target information. Because the user has confirmed the obtained target information, accuracy of the target information is improved.

S305. Redisplay the first interface.

In this embodiment, after generating the screen capture picture, the user equipment redisplays the first interface, to restore display of the first interface.

S306. Save the screen capture picture.

In this embodiment, after generating the screen capture picture, the user equipment may save the screen capture picture in a nonvolatile memory, to facilitate invoking by the user in subsequent use.

In the screen capturing method described in FIG. 3, when an interface of a target application is to be captured, the target application modifies the interface of the target application, so that a screen capture picture is generated according to a modified interface of the target application. Therefore, screen capturing efficiency and flexibility are improved.

Figure 4:
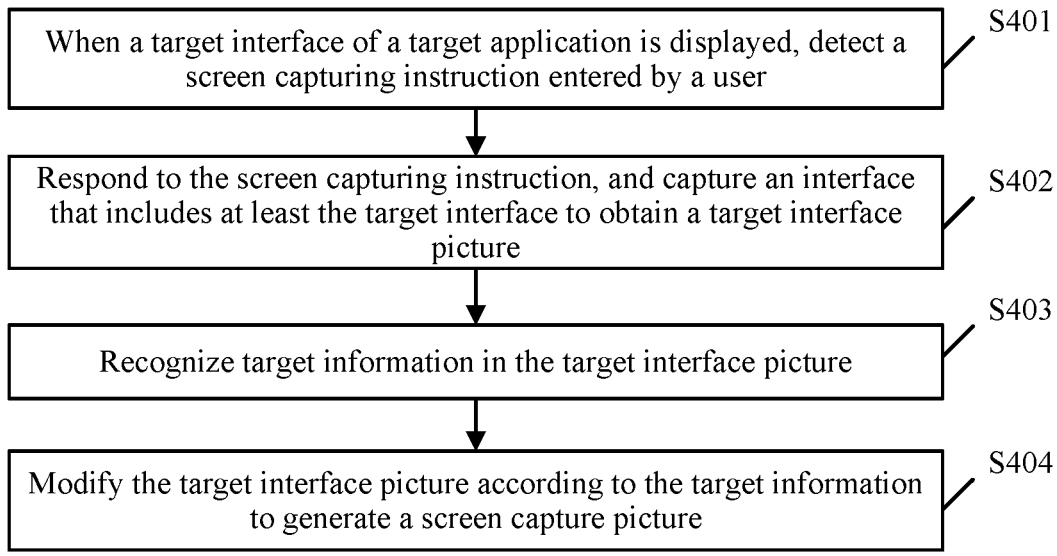
FIG. 4 is a flowchart of yet another screen capturing method disclosed in an embodiment of the present invention.

Referring to FIG. 4, FIG. 4 is a flowchart of yet another screen capturing method disclosed in an embodiment of the present invention. The screen capturing method shown in FIG. 4 is applicable to user equipment such as a mobile phone or a tablet computer, which is not limited in this embodiment of the present invention. As shown in FIG. 4, the screen capturing method may include the following steps.

S401. When a target interface of a target application is displayed, detect a screen capturing instruction entered by a user.

In this embodiment, when user equipment displays the target interface of the target application, and the user wants to capture the target interface but does not want to capture target information in the target interface, the user enters the screen capturing instruction, and the user equipment detects the screen capturing instruction entered by the user. The target application may be at least one of applications such as WeChat, QQ, Yu'E Bao, or Alipay of the user equipment. The target information may be information that the user does not want others to know, such as a user name, a user ID number, a user account amount, a user phone number, and a name in chat records.

In this embodiment, the target interface is the first interface in specific Embodiment 1, specific Embodiment 2, and specific Embodiment 3.

S402. Respond to the screen capturing instruction, and capture an interface that includes at least the target interface to obtain a target interface picture.

In this embodiment, when detecting the screen capturing instruction, the user equipment responds to the screen capturing instruction, and captures the interface that includes at least the target interface to obtain the target interface picture. After obtaining the target interface picture, the user equipment may save the target interface picture to facilitate invoking by the user in subsequent use, or the user equipment may not save the target interface picture, which is not limited in this embodiment.

S403. Recognize target information in the target interface picture.

In this embodiment, the user equipment first obtains the target interface picture, and then recognizes the target information in the target interface picture by means of optical character recognition (OCR).

In a possible implementation manner, a manner of recognizing the target information in the target interface picture is specifically: recognizing and marking a target information area in the target interface picture; detecting a target information area selected by the user from the marked target information area; and using information included in the selected target information area as the target information in the target interface picture.

In this embodiment, the user equipment first obtains the target interface picture, and then recognizes, by means of OCR, and marks the target information area in the target interface picture, so that the user selects the target information area from the marked target information area, where the information included in the selected target information area is used as the target information in the target interface picture. Because the user has confirmed the obtained target information, accuracy of the target information is improved.

In a possible implementation manner, a manner of recognizing the target information in the target interface picture is specifically: recognizing the target information in the target interface picture according to a keyword.

In this embodiment, the keyword may be preset by the user equipment or the target application, or may be specified by a cloud server, which is not limited in this embodiment.

In a possible implementation manner, a manner of recognizing the target information in the target interface picture is specifically: recognizing the target information in the target interface picture in a preset mode.

In this embodiment, a preset mode may be a mode in which only data or a letter whose length is greater than or equal to a preset length is recognized.

S404. Modify the target interface picture according to the target information to generate a screen capture picture.

In the screen capturing method described in FIG. 4, an interface that includes at least an interface of a target application is first captured to obtain a target interface picture; then, target information in the target interface picture is recognized, and the target interface picture is modified according to the target information to obtain a screen capture picture. Therefore, screen capturing efficiency and flexibility are improved.

Figure 5:
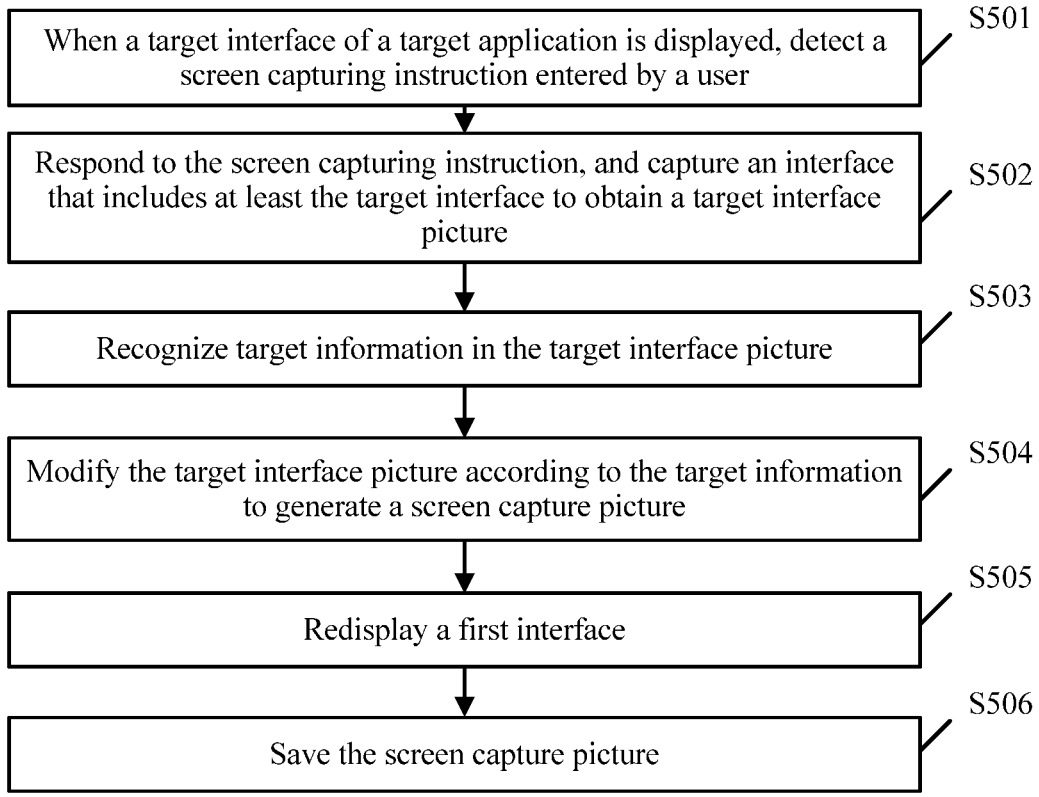
FIG. 5 is a flowchart of still yet another screen capturing method disclosed in an embodiment of the present invention.

Referring to FIG. 5, FIG. 5 is a flowchart of still yet another screen capturing method disclosed in an embodiment of the present invention. The screen capturing method shown in FIG. 5 is applicable to user equipment such as a mobile phone or a tablet computer, which is not limited in this embodiment of the present invention. As shown in FIG. 5, the screen capturing method may include the following steps:

S501. When a target interface of a target application is displayed, detect a screen capturing instruction entered by a user.

In this embodiment, when user equipment displays the target interface of the target application, and the user wants to capture the target interface but does not want to capture target information in the target interface, the user enters the screen capturing instruction, and the user equipment detects the screen capturing instruction entered by the user. The target application may be at least one of applications such as WeChat, QQ, Yu'E Bao, or Alipay of the user equipment. The target information may be information that the user does not want others to know, such as a user name, a user ID number, a user account amount, a user phone number, and a name in chat records.

In this embodiment, the target interface is the first interface in specific Embodiment 1, specific Embodiment 2, and specific Embodiment 3.

S502. Respond to the screen capturing instruction, and capture an interface that includes at least the target interface to obtain a target interface picture.

In this embodiment, when detecting the screen capturing instruction, the user equipment responds to the screen capturing instruction, and captures the interface that includes at least the target interface to obtain the target interface picture. After obtaining the target interface picture, the user equipment may save the target interface picture to facilitate invoking by the user in subsequent use, or the user equipment may not save the target interface picture, which is not limited in this embodiment.

S503. Recognize target information in the target interface picture.

In this embodiment, the user equipment first obtains the target interface picture, and then recognizes the target information in the target interface picture by means of optical character recognition (OCR).

In a possible implementation manner, a manner of recognizing the target information in the target interface picture is specifically: recognizing and marking a target information area in the target interface picture; detecting a target information area selected by the user from the marked target information area; and using information included in the selected target information area as the target information in the target interface picture.

In this embodiment, the user equipment first obtains the target interface picture, and then recognizes, by means of OCR, and marks the target information area in the target interface picture, so that the user selects the target information area from the marked target information area, where the information included in the selected target information area is used as the target information in the target interface picture. Because the user has confirmed the obtained target information, accuracy of the target information is improved.

In a possible implementation manner, a manner of recognizing the target information in the target interface picture is specifically: recognizing the target information in the target interface picture according to a keyword.

In this embodiment, the keyword may be preset by the user equipment or the target application, or may be specified by a cloud server, which is not limited in this embodiment.

In a possible implementation manner, a manner of recognizing the target information in the target interface picture is specifically: recognizing the target information in the target interface picture in a preset mode.

In this embodiment, a preset mode may be a mode in which only data or a letter whose length is greater than or equal to a preset length is recognized.

S504. Modify the target interface picture according to the target information to generate a screen capture picture.

S505. Redisplay a first interface.

In this embodiment, after obtaining the screen capture picture, the user equipment redisplays the first interface, to restore display of the first interface.

S506. Save the screen capture picture.

In this embodiment, after obtaining the screen capture picture, the user equipment may save the screen capture picture in a nonvolatile memory, to facilitate invoking by the user in subsequent use.

In the screen capturing method described in FIG. 5, an interface that includes at least an interface of a target application is first captured to obtain a target interface picture; then, target information in the target interface picture is recognized, and the target interface picture is modified according to the target information to obtain a screen capture picture. Therefore, screen capturing efficiency and flexibility are improved.

Figure 6:
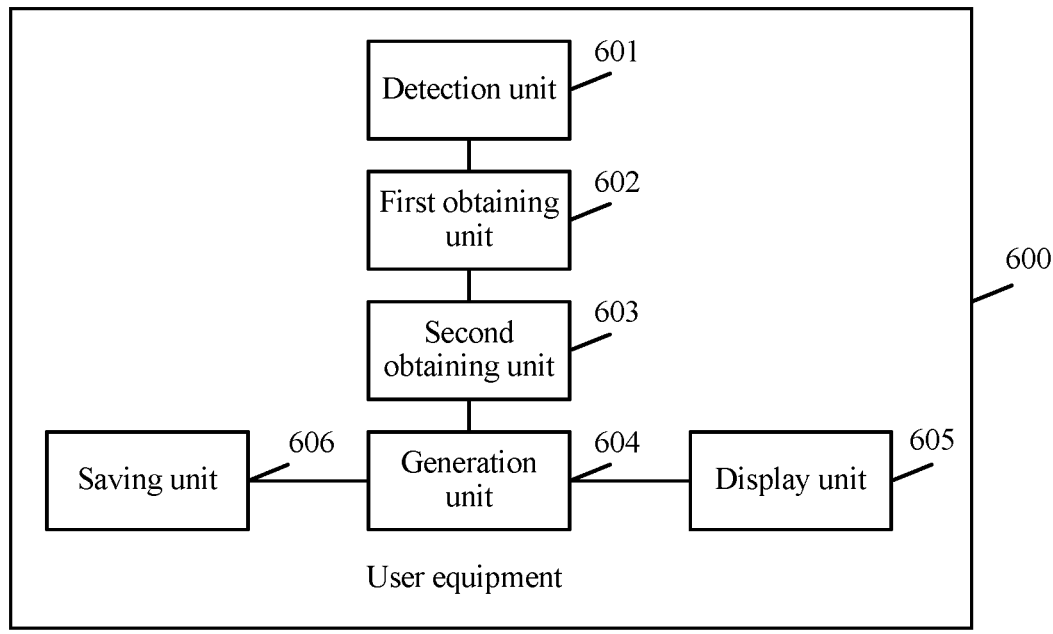
FIG. 6 is a structural diagram of user equipment disclosed in an embodiment of the present invention.

Referring to FIG. 6, FIG. 6 is user equipment disclosed in an embodiment of the present invention. The user equipment shown in FIG. 6 may be a mobile phone, a tablet computer, or the like, which is not limited in this embodiment of the present invention. As shown in FIG. 6, user equipment 600 may include: a detection unit 601, configured to: when a first interface of a target application is displayed, detect a screen capturing instruction entered by a user; a first obtaining unit 602, configured to: respond to the screen capturing instruction detected by the detection unit 601, and obtain target information in the first interface; a second obtaining unit 603, configured to modify the first interface according to the target information obtained by the first obtaining unit 602 to obtain a second interface; and a generation unit 604, configured to generate a screen capture picture according to the second interface obtained by the second obtaining unit 603.

In a possible implementation manner, the first obtaining unit 602 is specifically configured to: respond to the screen capturing instruction detected by the detection unit 601, and obtain the target information in the first interface according to a keyword.

In a possible implementation manner, the first obtaining unit 602 is specifically configured to: respond to the screen capturing instruction detected by the detection unit 601, and obtain the target information in the first interface in a preset mode.

In a possible implementation manner, the second obtaining unit 603 is specifically configured to modify, according to the target information obtained by the first obtaining unit 602, the first interface stored in a video memory to obtain the second interface.

In a possible implementation manner, the user equipment 600 may further include: a display unit 605, configured to redisplay the first interface.

Specifically, the generation unit 604 is configured to generate the screen capture picture according to the second interface obtained by the second obtaining unit 603, to trigger the display unit 605 to redisplay the first interface.

In a possible implementation manner, the user equipment 600 may further include: a saving unit 606, configured to save the screen capture picture generated by the generation unit 604.

In the user equipment described in FIG. 6, when an interface of a target application is to be captured, target information in the interface of the target application can be automatically obtained, and the interface of the target application is modified according to the target information; then, a screen capture picture is generated according to a modified interface of the target application. Therefore, screen capturing efficiency and flexibility are improved.

Figure 7:
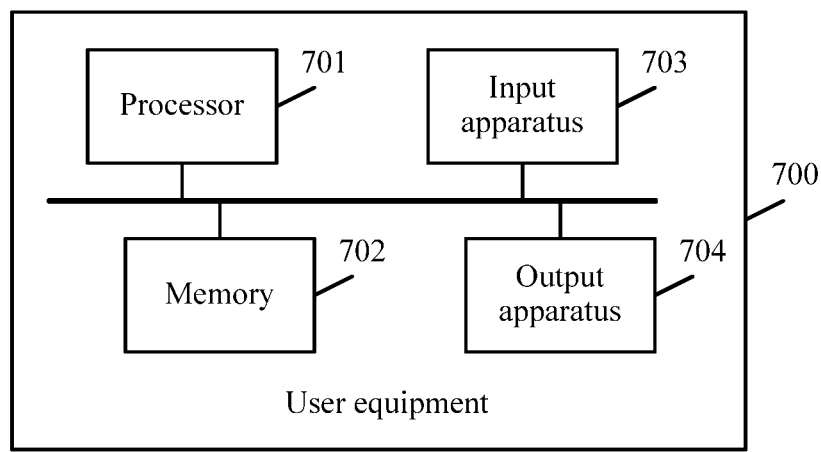
FIG. 7 is a structural diagram of another user equipment disclosed in an embodiment of the present invention.

Referring to FIG. 7, FIG. 7 is a structural diagram of another user equipment disclosed in an embodiment of the present invention. The user equipment shown in FIG. 7 may be a mobile phone, a tablet computer, or the like, which is not limited in this embodiment of the present invention. As shown in FIG. 7, user equipment 700 may include a processor 701, a memory 702, an input apparatus 703, and an output apparatus 704. The processor 701 may be connected to the memory 702, the input apparatus 703, and the output apparatus 704 by using a bus or in another manner.

The output apparatus 704 is configured to display a first interface of a target application.

The input apparatus 703 is configured to detect a screen capturing instruction entered by a user and send the screen capturing instruction to the processor 701.

The memory 702 stores a group of program code, and the processor 701 is configured to invoke the program code stored in the memory 702 to perform the following operations: responding to the screen capturing instruction sent by the input apparatus 703, and obtaining target information in the first interface; modifying the first interface according to the target information to obtain a second interface; and generating a screen capture picture according to the second interface.

In this embodiment, the input apparatus is configured to implement interaction between the user and the user equipment, and/or input information to the user equipment. For example, the input apparatus may receive digit or character information entered by the user, to generate signal input related to user setting or function control. In a specific implementation manner of the present invention, the input apparatus may be a touch panel, or may be another human-machine interaction interface such as a substantive input key or a microphone, or may be another apparatus for obtaining external information such as a camera. The touch panel is also referred to as a touchscreen or a touchscreen, and may collect an operation action of touching or approaching performed by the user on the touchscreen. For example, an operation action performed by the user on the touch panel or at a position close to the touch panel by using any proper object or accessory such as a finger or a stylus, and a corresponding connecting apparatus is driven according to a preset program. Optionally, the touch panel may include two parts: a touch detection apparatus and a touch controller. The touch detection apparatus detects a touch operation of the user, converts the detected touch operation into an electrical signal, and transmits the electrical signal to the touch controller; the touch controller receives the electrical signal from the touch detection apparatus, converts the electrical signal into touch point coordinates, and then transmits the touch point coordinates to the processor. The touch controller may further receive and execute a command delivered from the processor. In addition, the touch panel may be implemented by using multiple types such as a resistive type, a capacitive type, an infrared (Infrared), and a surface acoustic wave. In another implementation manner of the present invention, the substantive input key used by the input apparatus may include but is not limited to one or more of a physical keyboard, a function key (such as a volume control key or an on/off key), a trackball, a mouse, an operating lever, or the like. The input apparatus in a form of a microphone may collect a voice input by the user or an environment, and convert the voice into a command that is in a form of an electric signal and may be executed by the processor.

In this embodiment, the processor is a control center of the user equipment and is connected to parts of the entire user equipment by using various interfaces and lines, and implements various functions of the user equipment and/or processes data by running or executing a software program and/or a module that are/is stored in the memory and invoking data stored in the memory. The processor may be formed by an integrated circuit (Integrated Circuit, IC for short), for example, may be formed by a single packaged IC, or may be formed by connecting multiple packaged ICs having a same function or different functions. For example, the processor may include only a central processing unit (CPU for short), or may be a combination of a CPU, a digital signal processor (DSP for short), a graphic processing unit (GPU for short), and a control chip (for example, a baseband chip) in a communication unit. In an implementation manner of the present invention, the CPU may be a single computing core, or may include multiple computing cores.

In this embodiment, the output apparatus may include but is not limited to an image output apparatus, a voice output apparatus, and a touch output apparatus. The image output apparatus is configured to output a character, a picture, and/or a video. The image output apparatus may include a display panel, for example, a display panel configured in a form of an LCD (Liquid Crystal Display), an OLED (Organic Light-Emitting Diode), a field emission display (FED), or the like. Alternatively, the image output apparatus may include a reflective display, for example, an electrophoretic display or a display using an interferometric modulation of light technology. The image output apparatus may include a single display or multiple displays of different sizes. In a specific implementation manner of the present invention, the touch panel used in the foregoing input apparatus may also be used as the display panel of the output apparatus simultaneously. For example, after detecting a gesture operation of touching or approaching on the touch panel, the touch panel transmits the gesture operation to the processor to determine a type of a touch event, and then the processor provides corresponding visual output on the display panel according to the type of the touch event. The input apparatus and the output apparatus serve as two independent parts to implement input and output functions of the user equipment; however, in some embodiments, the touch panel and the display panel may be integrated to implement the input and output functions of the user equipment. For example, the image output apparatus may display various graphical user interfaces (GUI), to use the graphical user interfaces as virtual control components, and the graphical user interfaces include but are not limited to a window, a scrollbar, an icon, and a scrapbook, so that a user operates in a touch manner.

In this embodiment, the image output apparatus includes a filter and an amplifier that are configured to filter and amplify a video output by the processor. An audio output apparatus includes a digital-to-analog converter that is configured to convert an audio signal output by the processor from a digital format to an analog format.

In this embodiment, the memory may be configured to store a software program and a module, and the processor executes various functional applications of the user equipment and implements data processing by running the software program and the module that are stored in the memory. The memory mainly includes a program storage area and a data storage area, where the program storage area may store an operating system, an application program such as a sound playing program or an image playing program that is required by at least one function; and the data storage area may store data (such as audio data or a phonebook) that is created according to use of the user equipment, and the like. In a specific implementation manner of the present invention, the memory may include a volatile memory, for example, a nonvolatile random access memory (NVRAM), a phase change RAM (PRAM), or a magnetoresistive random access memory (MRAM); and may further include a nonvolatile memory, for example, at least one disk storage component, an electrically erasable programmable read-only memory (EEPROM), or a flash memory device such as an NOR flash memory or an NAND flash memory. The nonvolatile memory stores an operating system and an application program that are executed by the processor. The processor loads, from the nonvolatile memory, a running program and data to the memory, and saves digital content in a large quantity of storage apparatuses. The operating system includes various components and/or drivers that are configured to control and manage regular system tasks such as memory management, storage device control, and power management, and facilitate communication between various software and hardware. In an implementation manner of the present invention, the operating system may be the Android system of Google, the iOS system developed by Apple, the Windows operating system developed by Microsoft, or the like; or may be an embedded operating system such as Vxworks.

In this embodiment, the application program includes any application installed on the user equipment, and includes but is not limited to a browser, an email, an instant message service, word processing, keyboard virtualization, a window widget, encryption, digital rights management, voice recognition, voice duplication, positioning (such as a function provided by a Global Positioning System), music playback, and the like.

In a possible implementation manner, a manner in which the processor 701 responds to the screen capturing instruction and obtains the target information in the first interface is specifically: responding to the screen capturing instruction, and obtaining the target information in the first interface according to a keyword.

In a possible implementation manner, a manner in which the processor 701 responds to the screen capturing instruction and obtains the target information in the first interface is specifically: responding to the screen capturing instruction, and obtaining the target information in the first interface in a preset mode.

In a possible implementation manner, a manner in which the processor 701 modifies the first interface according to the target information to obtain the second interface is specifically: modifying, according to the target information, the first interface stored in a video memory to obtain the second interface.

In a possible implementation manner, after the processor 701 generates the screen capture picture according to the second interface, the output apparatus 704 is further configured to redisplay the first interface.

In a possible implementation manner, the processor 701 is further configured to invoke the program code stored in the memory 702 to perform the following operation: saving the screen capture picture.

In the user equipment described in FIG. 7, when an interface of a target application is to be captured, target information in the interface of the target application can be automatically obtained, and the interface of the target application is modified according to the target information; then, a screen capture picture is generated according to a modified interface of the target application. Therefore, screen capturing efficiency and flexibility are improved.

Figure 8:
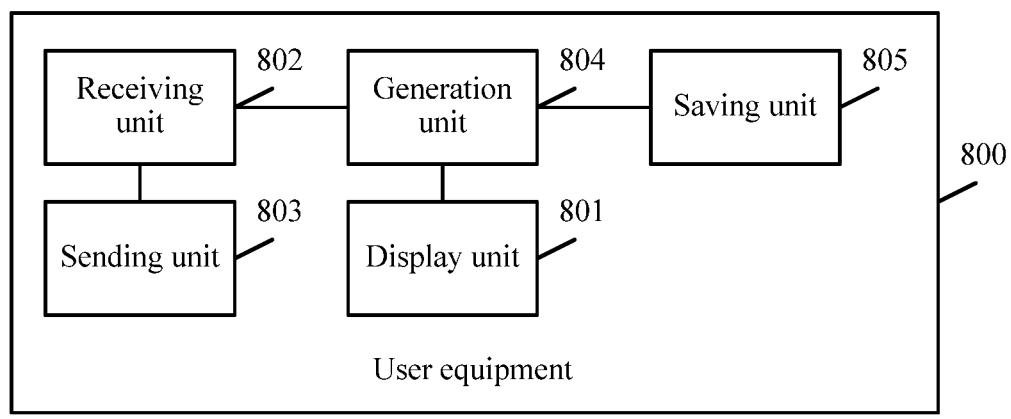
FIG. 8 is a structural diagram of still another user equipment disclosed in an embodiment of the present invention.

Referring to FIG. 8, FIG. 8 is a structural diagram of still another user equipment disclosed in an embodiment of the present invention. The user equipment shown in FIG. 8 may be a mobile phone, a tablet computer, or the like, which is not limited in this embodiment of the present invention. As shown in FIG. 8, user equipment 800 may include: a display unit 801, configured to run a target application, and display a first interface of the target application; a receiving unit 802, configured to receive a screen capturing instruction entered by a user; a sending unit 803, configured to send an indication message to the target application according to the screen capturing instruction received by the receiving unit 802, so that the target application modifies, according to the indication message, the first interface displayed by the display unit 801 to a second interface, where the first interface is different from the second interface; and a generation unit 804, configured to generate a screen capture picture according to the second interface.

In a possible implementation manner, the receiving unit 802 is further configured to receive a modification complete message sent by the target application, to trigger the generation unit 804 to generate the screen capture picture according to the second interface.

In a possible implementation manner, a manner in which the target application modifies the first interface to the second interface according to the indication message is specifically: obtaining, by the target application, target information in the first interface according to the indication message by using a keyword or in a preset mode, and modifying the first interface according to the target information to obtain the second interface.

In a possible implementation manner, a manner in which the target application modifies the first interface to the second interface according to the indication message is specifically: obtaining, by the target application, a target information area in the first interface according to the indication message by using a keyword or in a preset mode, and marking the target information area to obtain the second interface.

In a possible implementation manner, the generation unit 804 may include: a display subunit, configured to display the second interface; a detection subunit, configured to detect a target information area selected by the user from the marked target information area included in the second interface displayed by the display subunit; an obtaining subunit, configured to modify the second interface according to the selected target information area detected by the detection subunit to obtain a third interface; and a generation subunit, configured to generate the screen capture picture that includes at least the third interface obtained by the obtaining subunit.

In a possible implementation manner, the display unit 801 is further configured to redisplay the first interface.

Specifically, the generation unit 804 is configured to generate the screen capture picture according to the second interface, to trigger the display unit 801 to redisplay the first interface.

In a possible implementation manner, the user equipment 800 may further include: a saving unit 805, configured to save the screen capture picture generated by the generation unit 804.

In the user equipment described in FIG. 8, when an interface of a target application is to be captured, the target application modifies the interface of the target application, so that a screen capture picture is generated according to a modified interface of the target application. Therefore, screen capturing efficiency and flexibility are improved.

Figure 9:
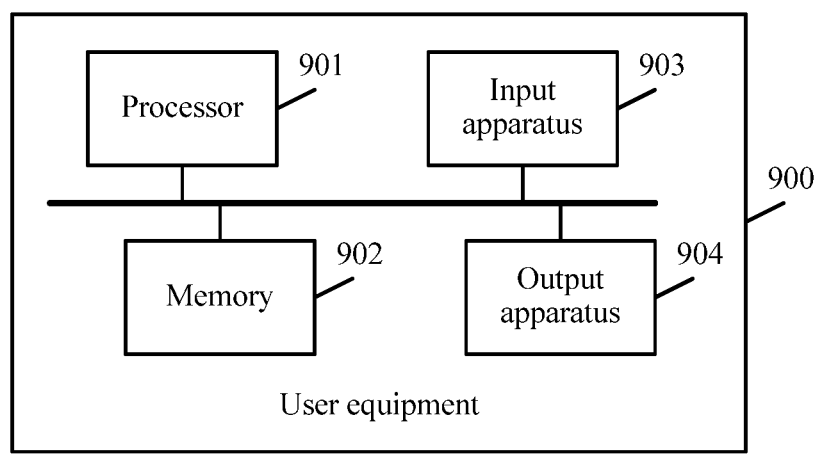
FIG. 9 is a structural diagram of yet another user equipment disclosed in an embodiment of the present invention.

Referring to FIG. 9, FIG. 9 is a structural diagram of yet another user equipment disclosed in an embodiment of the present invention. The user equipment shown in FIG. 9 may be a mobile phone, a tablet computer, or the like, which is not limited in this embodiment of the present invention. As shown in FIG. 9, user equipment 900 may include a processor 901, a memory 902, an input apparatus 903, and an output apparatus 904. The processor 901 may be connected to the memory 902, the input apparatus 903, and the output apparatus 904 by using a bus or in another manner.

The memory 902 stores a group of program code, and the processor 901 is configured to invoke the program code stored in the memory 902 to perform the following operation: running a target application.

The output apparatus 904 is configured to display a first interface of a target application.

The input apparatus 903 is configured to receive a screen capturing instruction entered by a user and send the screen capturing instruction to the processor.

The processor 901 is further configured to invoke the program code stored in the memory 902 to perform the following operations: sending an indication message to the target application according to the screen capturing instruction, so that the target application modifies the first interface to a second interface according to the indication message, where the first interface is different from the second interface; and generating a screen capture picture according to the second interface.

In a possible implementation manner, a manner in which the target application modifies the first interface to the second interface according to the indication message is specifically: obtaining, by the target application, target information in the first interface according to the indication message by using a keyword or in a preset mode, and modifying the first interface according to the target information to obtain the second interface.

In a possible implementation manner, a manner in which the target application modifies the first interface to the second interface according to the indication message is specifically: obtaining, by the target application, a target information area in the first interface according to the indication message by using a keyword or in a preset mode, and marking the target information area to obtain the second interface.

In a possible implementation manner, a manner in which the processor 901 generates the screen capture picture according to the second interface is specifically: displaying the second interface; detecting a target information area selected by the user from the marked target information area included in the second interface; modifying the second interface according to the selected target information area to obtain a third interface; and generating the screen capture picture that includes at least the third interface.

In a possible implementation manner, after the processor 901 generates the screen capture picture according to the second interface, the output apparatus 904 is further configured to redisplay the first interface.

In a possible implementation manner, the processor 901 is further configured to invoke the program code stored in the memory to perform the following operation: saving the screen capture picture.

In the user equipment described in FIG. 9, when an interface of a target application is to be captured, the target application modifies the interface of the target application, so that a screen capture picture is generated according to a modified interface of the target application. Therefore, screen capturing efficiency and flexibility are improved.

Figure 10:
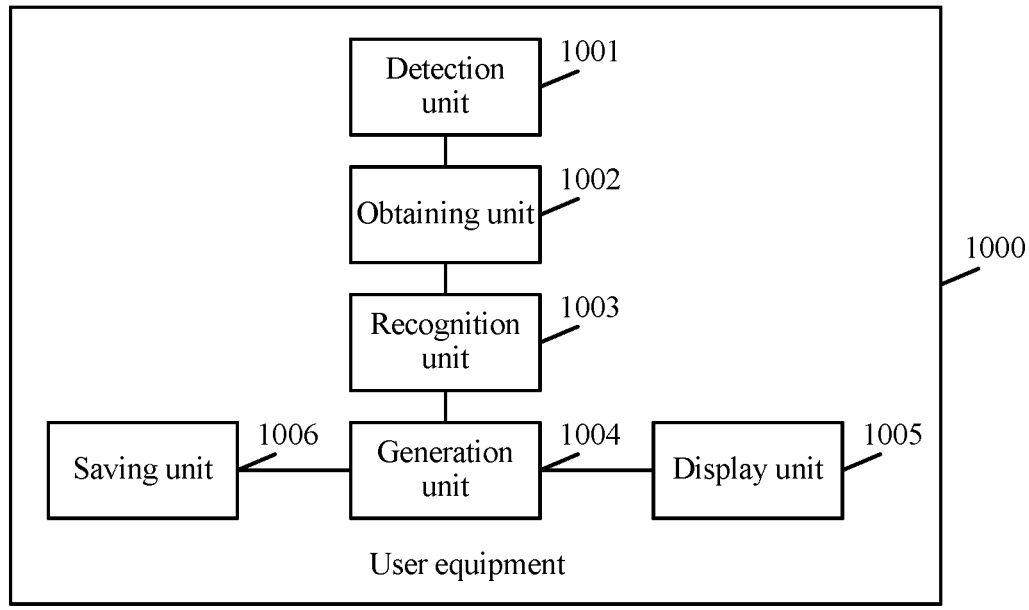
FIG. 10 is a structural diagram of still yet another user equipment disclosed in an embodiment of the present invention.

Referring to FIG. 10, FIG. 10 is a structural diagram of still yet another user equipment disclosed in an embodiment of the present invention. The user equipment shown in FIG. 10 may be a mobile phone, a tablet computer, or the like, which is not limited in this embodiment of the present invention. As shown in FIG. 10, user equipment 1000 may include: a detection unit 1001, configured to: when a target interface of a target application is displayed, detect a screen capturing instruction entered by a user; an obtaining unit 1002, configured to: respond to the screen capturing instruction detected by the detection unit 1001, and capture an interface that includes at least the target interface to obtain a target interface picture; a identifying unit 1003, configured to recognize target information in the target interface picture obtained by the obtaining unit 1002; and a generation unit 1004, configured to modify the target interface picture according to the target information recognized by the identifying unit 1003 to generate a screen capture picture.

In a possible implementation manner, the identifying unit 1003 may include: a marking subunit, configured to recognize and mark a target information area in the target interface picture obtained by the obtaining unit 1002; and a detection subunit, configured to: detect a target information area selected by the user from the target information area marked by the marking subunit, and use information included in the selected target information area as the target information in the target interface picture.

In a possible implementation manner, the identifying unit 1003 is specifically configured to recognize, according to a keyword, the target information in the target interface picture obtained by the first obtaining unit 1002.

In a possible implementation manner, the identifying unit 1003 is specifically configured to recognize, in a preset mode, the target information in the target interface picture obtained by the first obtaining unit 1002.

In a possible implementation manner, the user equipment 1000 may further include: a display unit 1005, configured to redisplay a first interface.

Specifically, the generation unit 1004 is configured to modify the target interface picture according to the target information recognized by the identifying unit 1003 to obtain the screen capture picture, to trigger the display unit 1005 to redisplay the first interface.

In a possible implementation manner, the user equipment 1000 may further include: a saving unit 1006, configured to save the screen capture picture generated by the generation unit 1004.

In the user equipment described in FIG. 10, an interface that includes at least an interface of a target application is first captured to obtain a target interface picture; then, target information in the target interface picture is recognized, and the target interface picture is modified according to the target information to obtain a screen capture picture. Therefore, screen capturing efficiency and flexibility are improved.

Figure 11:
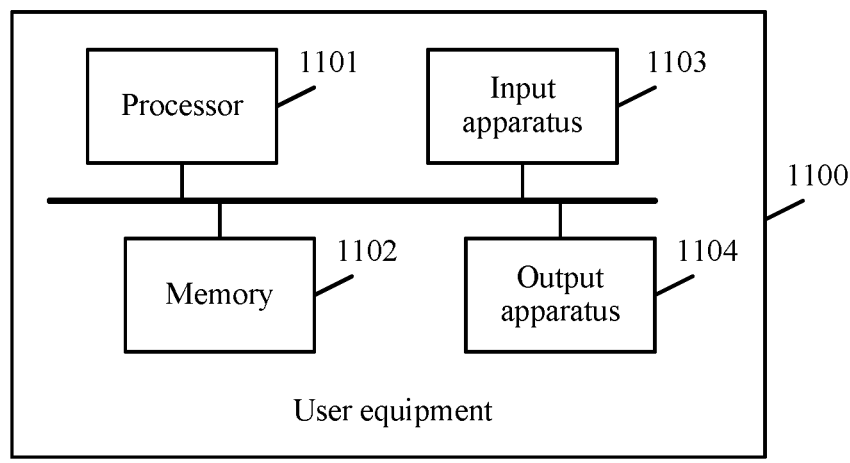
FIG. 11 is a structural diagram of further user equipment disclosed in an embodiment of the present invention.

Referring to FIG. 11, FIG. 11 is a structural diagram of further user equipment disclosed in an embodiment of the present invention. The user equipment shown in FIG. 11 may be a mobile phone, a tablet computer, or the like, which is not limited in this embodiment of the present invention. As shown in FIG. 11, user equipment 1100 may include a processor 1101, a memory 1102, an input apparatus 1103, and an output apparatus 1104. The processor 1101 may be connected to the memory 1102, the input apparatus 1103, and the output apparatus 1104 by using a bus or in another manner.

The output apparatus 1104 is configured to display a target interface of a target application.

The input apparatus 1103 is configured to detect a screen capturing instruction entered by a user and send the screen capturing instruction to the processor 1101.

The memory 1102 stores a group of program code, and the processor 1101 is configured to invoke the program code stored in the memory 1102 to perform the following operations: responding to the screen capturing instruction sent by the input apparatus 1103, and capturing an interface that includes at least the target interface displayed by the output apparatus 1104 to obtain a target interface picture; recognizing target information in the target interface picture; and modifying the target interface picture according to the target information to generate a screen capture picture.

In this embodiment, the input apparatus is configured to implement interaction between the user and the user equipment, and/or input information to the user equipment. For example, the input apparatus may receive digit or character information entered by the user, to generate signal input related to user setting or function control. In a specific implementation manner of the present invention, the input apparatus may be a touch panel, or may be another human-machine interaction interface such as a substantive input key or a microphone, or may be another apparatus for obtaining external information such as a camera. The touch panel is also referred to as a touchscreen or a touchscreen, and may collect an operation action of touching or approaching performed by the user on the touchscreen. For example, an operation action performed by the user on the touch panel or at a position close to the touch panel by using any proper object or accessory such as a finger or a stylus, and a corresponding connecting apparatus is driven according to a preset program. Optionally, the touch panel may include two parts: a touch detection apparatus and a touch controller. The touch detection apparatus detects a touch operation of the user, converts the detected touch operation into an electrical signal, and transmits the electrical signal to the touch controller; the touch controller receives the electrical signal from the touch detection apparatus, converts the electrical signal into touch point coordinates, and then transmits the touch point coordinates to the processor. The touch controller may further receive and execute a command delivered from the processor. In addition, the touch panel may be implemented by using multiple types such as a resistive type, a capacitive type, an infrared (Infrared), and a surface acoustic wave. In another implementation manner of the present invention, the substantive input key used by the input apparatus may include but is not limited to one or more of a physical keyboard, a function key (such as a volume control key or an on/off key), a trackball, a mouse, an operating lever, or the like. The input apparatus in a form of a microphone may collect a voice input by the user or an environment, and convert the voice into a command that is in a form of an electric signal and may be executed by the processor.

In this embodiment, the processor is a control center of the user equipment and is connected to parts of the entire user equipment by using various interfaces and lines, and implements various functions of the user equipment and/or processes data by running or executing a software program and/or a module that are/is stored in the memory and invoking data stored in the memory. The processor may be formed by an IC, for example, may be formed by a single packaged IC, or may be formed by connecting multiple packaged ICs having a same function or different functions. For example, the processor may include only a CPU, or may be a combination of a CPU, a DSP, a GPU and a control chip (for example, a baseband chip) in a communication unit. In an implementation manner of the present invention, the CPU may be a single computing core, or may include multiple computing cores.

In this embodiment, the output apparatus may include but is not limited to an image output apparatus, a voice output apparatus, and a touch output apparatus. The image output apparatus is configured to output a character, a picture, and/or a video. The image output apparatus may include a display panel, for example, a display panel configured in a form of an LCD, an OLED, an FED, or the like. Alternatively, the image output apparatus may include a reflective display, for example, an electrophoretic display or a display using an interferometric modulation of light technology. The image output apparatus may include a single display or multiple displays of different sizes. In a specific implementation manner of the present invention, the touch panel used in the foregoing input apparatus may also be used as the display panel of the output apparatus simultaneously. For example, after detecting a gesture operation of touching or approaching on the touch panel, the touch panel transmits the gesture operation to the processor to determine a type of a touch event, and then the processor provides corresponding visual output on the display panel according to the type of the touch event. The input apparatus and the output apparatus serve as two independent parts to implement input and output functions of the user equipment; however, in some embodiments, the touch panel and the display panel may be integrated to implement the input and output functions of the user equipment. For example, the image output apparatus may display various GUI, to use the GUI as virtual control components, and the graphical user interfaces include but are not limited to a window, a scrollbar, an icon, and a scrapbook, so that a user operates in a touch manner.

In this embodiment, the image output apparatus includes a filter and an amplifier that are configured to filter and amplify a video output by the processor. An audio output apparatus includes a digital-to-analog converter that is configured to convert an audio signal output by the processor from a digital format to an analog format.

In this embodiment, the memory may be configured to store a software program and a module, and the processor executes various functional applications of the user equipment and implements data processing by running the software program and the module that are stored in the memory. The memory mainly includes a program storage area and a data storage area, where the program storage area may store an operating system, an application program such as a sound playing program or an image playing program that is required by at least one function; and the data storage area may store data (such as audio data or a phonebook) that is created according to use of the user equipment, and the like. In a specific implementation manner of the present invention, the memory may include a volatile memory, for example, an NVRAM, a PRAM, or an MRAM, and may further include a nonvolatile memory, for example, at least one disk storage component, an EEPROM, or a flash memory device such as an NOR flash memory or an NAND flash memory. The nonvolatile memory stores an operating system and an application program that are executed by the processor. The processor loads, from the nonvolatile memory, a running program and data to the memory, and saves digital content in a large quantity of storage apparatuses. The operating system includes various components and/or drivers that are configured to control and manage regular system tasks such as memory management, storage device control, and power management, and facilitate communication between various software and hardware. In an implementation manner of the present invention, the operating system may be the Android system of Google, the iOS system developed by Apple, the Windows operating system developed by Microsoft, or the like; or may be an embedded operating system such as Vxworks.

In this embodiment, the application program includes any application installed on the user equipment, and includes but is not limited to a browser, an email, an instant message service, word processing, keyboard virtualization, a window widget, encryption, digital rights management, voice recognition, voice duplication, positioning (such as a function provided by a Global Positioning System), music playback, and the like.

In a possible implementation manner, a manner in which the processor unit 1101 recognizes the target information in the target interface picture is specifically: recognizing and marking a target information area in the target interface picture; detecting a target information area selected by the user from the marked target information area; and using information included in the selected target information area as the target information in the target interface picture.

In a possible implementation manner, a manner in which the processor unit 1101 recognizes the target information in the target interface picture is specifically: recognizing the target information in the target interface picture according to a keyword.

In a possible implementation manner, a manner in which the processor unit 1101 recognizes the target information in the target interface picture is specifically: recognizing the target information in the target interface picture in a preset mode.

In a possible implementation manner, after the processor 1101 modifies the target interface picture according to the target information to generate the screen capture picture, the output apparatus 1104 is further configured to redisplay a first interface.

In a possible implementation manner, the processor 1101 is further configured to invoke the program code stored in the memory 1102 to perform the following operation: saving the screen capture picture.

In the user equipment described in FIG. 11, an interface that includes at least an interface of a target application is first captured to obtain a target interface picture; then, target information in the target interface picture is recognized, and the target interface picture is modified according to the target information to obtain a screen capture picture. Therefore, screen capturing efficiency and flexibility are improved.

In an embodiment, an embodiment of the present invention further discloses a computer storage medium, where the computer storage medium stores a computer program. When the computer program in the computer storage medium is read on a computer, the computer can complete all steps of the screen capturing method disclosed in the embodiments of the present invention.

It should be noted that, for brief description, the foregoing method embodiments are represented as a series of actions. However, a person skilled in the art should appreciate that the present invention is not limited to the described order of the actions, because according to the present invention, some steps may be performed in other orders or simultaneously. In addition, a person skilled in the art should also appreciate that all the embodiments described in the specification are exemplary embodiments, and the related actions and modules are not necessarily mandatory to the present invention.

A person of ordinary skill in the art may understand that all or some of the steps of the methods in the embodiments may be implemented by a program instructing relevant hardware. The program may be stored in a computer readable storage medium. The storage medium may include a flash memory, a read-only memory (ROM), a random access memory (RAM), a magnetic disk, and an optical disc.

The screen capturing method and the apparatus provided in the embodiments of the present invention are described in detail above. The principle and implementation manners of the present invention are described herein through specific examples. The description about the foregoing embodiments is merely provided to help understand the method and core ideas of the present invention. In addition, a person of ordinary skill in the art can make variations and modifications to the present invention in terms of the specific implementation manners and application scopes according to the ideas of the present invention. Therefore, the content of specification shall not be construed as a limitation on the present invention.

What is claimed is:

1. A method, comprising:
running, by a user equipment (UE), an application, and displaying a first interface of the application;
receiving, by the UE, a screen capturing instruction;
in response to receiving the screen capturing instruction, identifying, by the UE, a target information area, and modifying the first interface to obtain a second interface, wherein the second interface comprises an indication of the target information area, and the target information area comprises target information;
detecting, by the UE, a user selection of the target information area in the second interface; and
in response to the user selection, modifying, by the UE, the second interface to obtain a third interface, wherein the third interface comprises a modification of the target information, and generating a screen capture picture that comprises the third interface.

2. The method according to claim 1, wherein modifying the first interface to obtain the second interface comprises:
obtaining the target information area in the first interface using a keyword or in a preset mode, and marking the target information area to obtain the second interface.

3. The method according to claim 1, wherein after generating the screen capture picture, the method further comprises redisplaying the first interface.

4. The method according to claim 1, further comprising:
saving the screen capture picture.

5. A method, comprising:
running, by a user equipment (UE), an application, and displaying a first interface of the application;
detecting, by the UE, a screen capturing instruction;
in response to detecting the screen capturing instruction, capturing, by the UE, an interface that comprises at least the first interface to obtain an interface picture, and recognizing and indicating a target information area in the interface picture, wherein the target information area comprises target information;
detecting, by the UE, a user selection of the target information area; and
in response to the user selection, modifying, by the UE, the interface picture to generate a screen capture picture, wherein the screen capture picture comprises a modification of the target information.

6. The method according to claim 5, wherein recognizing the target information area in the interface picture comprises:
recognizing the target information area in the interface picture according to a keyword.

7. The method according to claim 5, wherein recognizing the target information area in the interface picture comprises:
recognizing the target information area in the interface picture in a preset mode.

8. The method according to claim 5, wherein after modifying the interface picture to generate a screen capture picture, the method further comprises:
redisplaying the first interface.

9. The method according to claim 5, further comprising:
saving the screen capture picture.

10. User equipment, comprising:
a processor;
a memory;
an input apparatus; and
an output apparatus;
wherein the memory stores a group of program code, and the processor is configured to invoke the program code stored in the memory to run an application;
wherein the output apparatus is configured to display a first interface of the application;
wherein the input apparatus is configured to receive a screen capturing instruction; and
wherein the processor is further configured to invoke the program code stored in the memory to:
in response to receiving the screen capturing instruction, identify a target information area, and modify the first interface to obtain a second interface, wherein the second interface comprises an indication of the target information area, and the target information area comprises target information;
detect a user selection of the target information area in the second interface; and
in response to detecting the user selection, modify the second interface to obtain a third interface, wherein the third interface comprises a modification of the target information, and generate a screen capture picture that comprises the third interface.

11. The user equipment according to claim 10, wherein modifying the first interface to obtain the second interface comprises:
obtaining the target information area in the first interface using a keyword or in a preset mode, and marking the target information area to obtain the second interface.

12. The user equipment according to claim 10, wherein after the processor generates the screen capture picture, the output apparatus is further configured to redisplay the first interface.

* * * * *